US012448839B1

(12) United States Patent
Flakes

(10) Patent No.: US 12,448,839 B1
(45) Date of Patent: Oct. 21, 2025

(54) DOOR DEFENDER SYSTEM

(71) Applicant: Maurice Thomas Flakes, Valrico, FL (US)

(72) Inventor: Maurice Thomas Flakes, Valrico, FL (US)

( * ) Notice: Subject to any disclaimer, the term of this patent is extended or adjusted under 35 U.S.C. 154(b) by 261 days.

(21) Appl. No.: 17/895,647

(22) Filed: Aug. 25, 2022

Related U.S. Application Data

(63) Continuation-in-part of application No. 15/800,166, filed on Nov. 1, 2017, now abandoned.

(60) Provisional application No. 62/423,892, filed on Nov. 18, 2016.

(51) Int. Cl.
*E06B 9/52* (2006.01)

(52) U.S. Cl.
CPC ........ *E06B 9/521* (2013.01); *E06B 2009/527* (2013.01)

(58) Field of Classification Search
CPC ... E06B 9/36; E06B 9/52; E06B 9/521; E06B 2009/527; A47H 23/02; A47H 23/04; A47H 23/05; A47H 2023/025
See application file for complete search history.

(56) References Cited

U.S. PATENT DOCUMENTS 1,336,325 A 4/1920 Warren
2,041,258 A 5/1936 Mitchell
2,125,422 A * 8/1938 Bosworth .............. A47H 23/08 160/237
2,220,064 A 11/1940 Clark
2,239,631 A 4/1941 Jacob et al.
2,727,272 A 12/1955 William et al.
2,736,373 A 2/1956 Truesdale
3,033,127 A 5/1962 Kuebler
3,070,918 A 1/1963 Sempler
3,130,760 A 4/1964 Juneman
3,213,506 A 10/1965 Fernberg
3,327,983 A 6/1967 Snapp
3,399,713 A 9/1968 Wilson
3,437,127 A 4/1969 Lukashok
3,494,244 A 2/1970 Wayland
4,070,735 A 1/1978 Canaday
4,095,642 A 6/1978 McKinnon et al.
4,165,778 A 8/1979 Smith
4,232,725 A 11/1980 Gidge
(Continued)

FOREIGN PATENT DOCUMENTS

DE 202006000953 U1 4/2006
DE 102013219066 3/2015
(Continued)

OTHER PUBLICATIONS

Curtron "Mesh Strip Door/ Insect Barrier and Bug Curtain" <https://www.webstaurantstore.com/curtron-sd-mesh-3684-36-x-84-mesh-strip-door-insect-barrier-and-bug-curtain/5173684MSD.html> 2016 (Year: 2016).*
(Continued)

*Primary Examiner* — Johnnie A. Shablack
(74) *Attorney, Agent, or Firm* — GrayRobinson, P.A.

(57) ABSTRACT

A screen assembly includes a plurality of screens with an upper plate in each screen. The screen assembly also has an assembling plate coupling together the plurality of screens. The plurality of screens overlap each other. A coupling assembly includes a generally C-shaped clamp attachable to a suspension bracket and an upper door frame.

2 Claims, 5 Drawing Sheets

(56) References Cited

U.S. PATENT DOCUMENTS

| | | | |
|---|---|---|---|
| 4,257,471 | A | 3/1981 | Thurmond, Jr. |
| 4,306,823 | A | 12/1981 | Nashlund |
| 4,312,396 | A | 1/1982 | McKinnon et al. |
| 4,335,777 | A | 6/1982 | Simon |
| 4,340,106 | A | 7/1982 | Horn |
| 4,355,678 | A | 10/1982 | Romano |
| 4,382,461 | A | 5/1983 | Schenker |
| 4,384,606 | A | 5/1983 | Johnston et al. |
| 4,388,961 | A | 6/1983 | Schaefer et al. |
| 4,432,406 | A | 2/1984 | Belanger et al. |
| 4,449,270 | A | 5/1984 | Brabant |
| 4,635,699 | A | 1/1987 | Kauffman et al. |
| 4,708,183 | A | 11/1987 | Figueroa |
| D293,880 | S | 1/1988 | Takahashi |
| 4,874,028 | A | 10/1989 | Lynch et al. |
| 4,886,103 | A | 12/1989 | Baier |
| 4,887,659 | A | 12/1989 | West |
| 4,922,988 | A | 5/1990 | Loomis |
| 4,938,154 | A | 7/1990 | Watt |
| 5,060,712 | A | 10/1991 | Ehrlich |
| 5,127,460 | A | 7/1992 | Abadi et al. |
| 5,143,137 | A | 9/1992 | West |
| 5,146,971 | A | 9/1992 | McCarty |
| 5,331,993 | A | 7/1994 | Billbury |
| 5,429,404 | A | 7/1995 | King |
| 5,520,237 | A | 5/1996 | Finkelstein et al. |
| 5,601,132 | A | 2/1997 | Goodman |
| 5,642,819 | A | 7/1997 | Ronia |
| 6,038,749 | A | 3/2000 | Eberhardt |
| 6,050,322 | A | 4/2000 | Finkelstein et al. |
| 6,189,264 | B1 | 2/2001 | DiVeroli |
| 6,282,822 | B1 | 9/2001 | Rinzler et al. |
| 6,394,171 | B1 | 5/2002 | Robbins, III |
| 6,834,704 | B2 | 12/2004 | Cheng |
| 6,933,030 | B1 | 8/2005 | Paterni |
| 6,941,999 | B2 | 9/2005 | Paterni |
| 6,945,304 | B1 | 9/2005 | Kleynjans |
| 6,983,856 | B1 | 1/2006 | Burks |
| 7,011,132 | B2 | 3/2006 | Robbins, III |
| 7,270,165 | B1 | 9/2007 | Chuang |
| 7,390,250 | B2 | 6/2008 | Reinhardt |
| 7,393,034 | B1 | 7/2008 | Brussard et al. |
| 7,832,454 | B2 | 11/2010 | Lyons |
| 7,958,926 | B2 | 6/2011 | Colson et al. |
| 8,365,803 | B2 | 2/2013 | Schoenheit et al. |
| 8,475,910 | B2 | 7/2013 | Thiagarajan |
| 8,511,962 | B2 | 8/2013 | Schuech et al. |
| 8,579,006 | B2 | 11/2013 | Levin |
| 8,695,193 | B2 | 4/2014 | Kress et al. |
| 8,695,194 | B2 | 4/2014 | Kress et al. |
| 9,163,451 | B1 | 10/2015 | Curry |
| 11,598,146 | B2 * | 3/2023 | Conboy .................. E06B 9/386 |
| 2002/0000301 | A1 | 1/2002 | Rolin |
| 2003/0047294 | A1 | 3/2003 | Fritsche et al. |
| 2003/0159392 | A1 | 8/2003 | Broek et al. |
| 2003/0173042 | A1 | 9/2003 | Haas |
| 2004/0011480 | A1 | 1/2004 | Porte |
| 2005/0224197 | A1 | 10/2005 | Cheng et al. |
| 2005/0230067 | A1 | 10/2005 | Jordan et al. |
| 2007/0215297 | A1 | 9/2007 | Lin |
| 2008/0006372 | A1 | 1/2008 | Beasley |
| 2008/0190064 | A1 | 8/2008 | Craig et al. |
| 2008/0216968 | A1 | 9/2008 | Falato et al. |
| 2009/0050280 | A1 | 2/2009 | Morris et al. |
| 2009/0205791 | A1 | 8/2009 | Folch |
| 2010/0212840 | A1 | 8/2010 | Jevaney |
| 2011/0030169 | A1 | 2/2011 | Aebi et al. |
| 2011/0226716 | A1 | 9/2011 | Chen |
| 2013/0139978 | A1 | 6/2013 | McKinnon |
| 2014/0124148 | A1 | 5/2014 | Sickels et al. |
| 2015/0047794 | A1 | 2/2015 | Colson et al. |
| 2018/0185970 | A1 | 7/2018 | Simmons |

FOREIGN PATENT DOCUMENTS

| | | | |
|---|---|---|---|
| EP | 2037075 | A2 | 3/2009 |
| ES | 2307459 | A1 | 11/2008 |
| FR | 2921404 | A1 | 3/2009 |
| GB | 2381819 | A | 5/2003 |
| GB | 2518026 | A | 3/2015 |
| KR | 20090004187 | U | 5/2009 |

OTHER PUBLICATIONS

Curtron “SD-MESH-3684 36"× 84" Mesh Strip Door / Insect Barrier and Bug Curtain,” WebstaurantStore. Mar. 1, 2016.

* cited by examiner

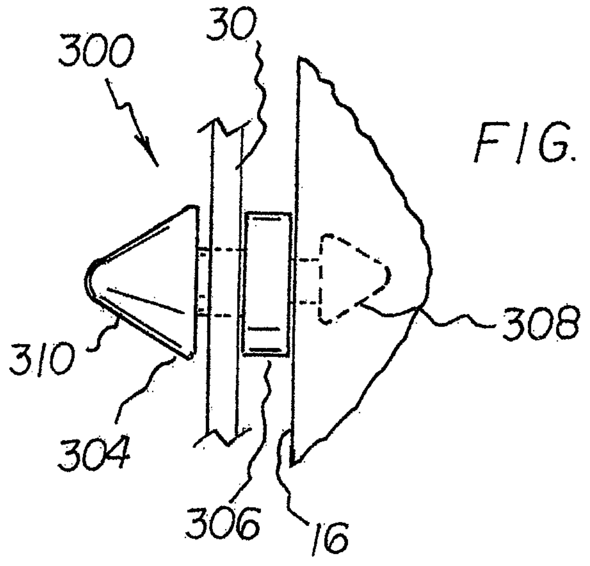
FIG. 2A
FIG. 2B
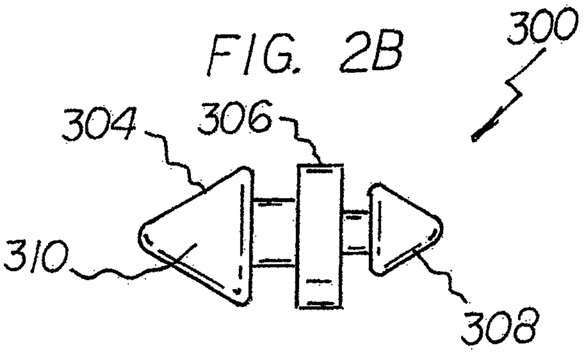
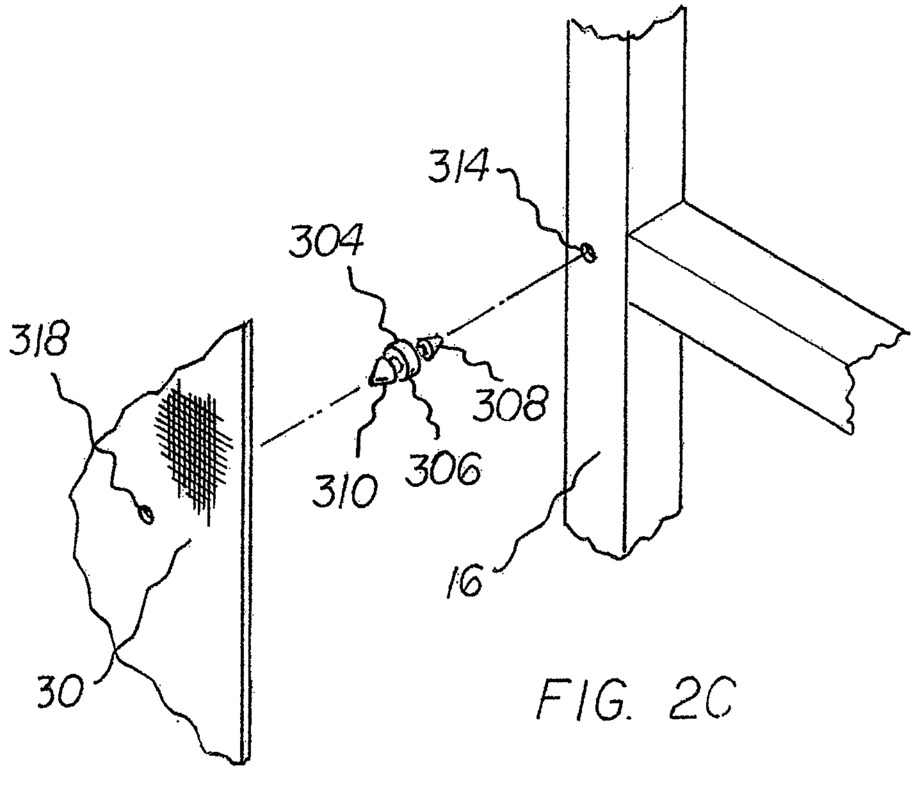
FIG. 2C

FIG. 3
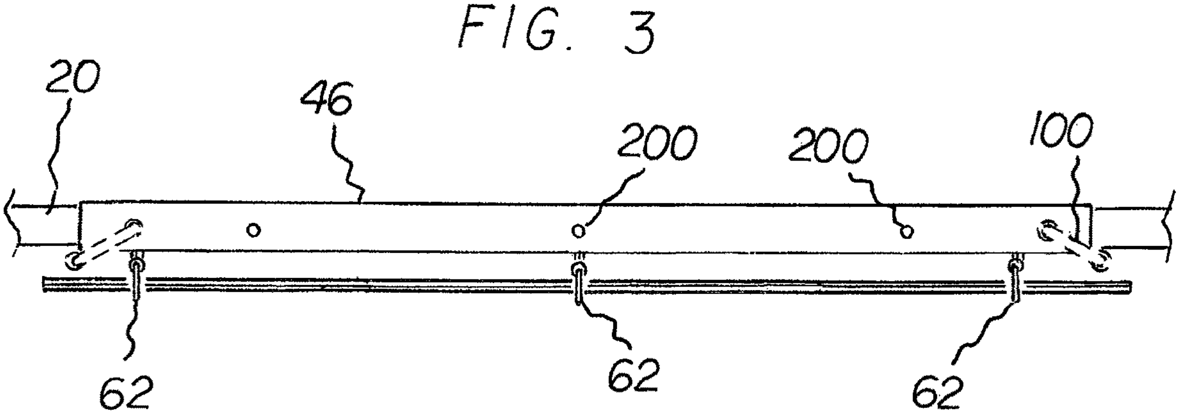
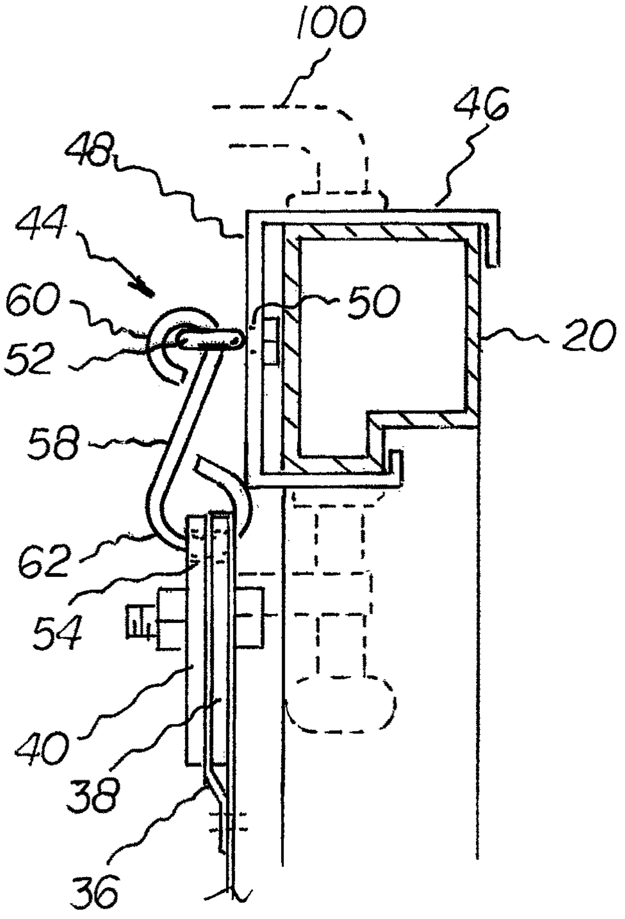
FIG. 4

DOOR DEFENDER SYSTEM

CROSS-REFERENCE TO RELATED APPLICATIONS

This application is a continuation-in-part of, and claims priority to, co-pending application Ser. No. 15/800,166, filed on Nov. 1, 2017, entitled "Door Defender System," which itself claims priority to Provisional Patent Application Ser. No. 62/423,892, filed on Nov. 18, 2016, entitled "Door Defender System." The contents of these applications are fully incorporated herein for all purposes.

BACKGROUND OF THE INVENTION

Field of the Invention

The present disclosure relates to a door defender system. The system may be alternatively referenced as a gravity reactive suspension system, or G.R.S.S. The disclosure more particularly pertains to restricting the movement of most flying insects through the doorways of pool cages, patio cages, and other enclosures, while at the same time allowing adults, children, and pets to pass there through.

Description of the Prior Art

The use of screens of various configurations is known in the prior art. More specifically, screens of various configurations previously devised and utilized for the purpose of restricting an intrusion of most insects are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a door defender system that restricts the movement of most insects, including flying insects, from outdoors and prevents insects from passing through, while allowing adults, children, pets, etc. to pass through. The door defender system greatly reduces the opening or exit of a pool or patio cage doorway. With the door defender system in place, you pass through the panels and they form around you, and after you pass through the gravity reactive suspension of the door defender system closes the screen panels back to their original positions, thereby preventing flying insects from entering into the pool or patio cage area. The door defender system has a unique user friendly design and installation and is designed for many seasons of use, benefit and protection. The door defender system as described above can be offered in a detachable version for seasonal use and easy storage by simply separating the suspension bracket from the suspension track.

In this respect, the door defender system according to the present invention substantially departs from the conventional concepts and designs of the prior art, and in doing so provides an apparatus primarily developed for the purpose of restricting entry of insects from outdoors to indoors. It is a second line of defense against flying insects moving from outside to inside insects. The first line of defense being a completely shut door.

Therefore, it can be appreciated that there exists a continuing need for the new and improved door defender system which can be used for restricting the movement of most flying insects from outside to inside areas by reducing the doorway opening to only what is needed. The doorway defender system forms around you as you pass through it, greatly reducing the exposed opening area. In this regard, the present invention substantially fulfills this need.

SUMMARY OF THE INVENTION

In view of the disadvantages inherent in the known types of screens of various configurations now present in the prior art, the present invention provides an improved door defender system. As such, the general purpose of the present invention, which will be described subsequently in greater detail, is to provide a new and improved door defender system and method which has all the advantages of the prior art and none of the disadvantages.

To attain this, from a broad perspective, the present invention essentially comprises a door defender system which includes a screen assembly having a plurality of screens with an upper plate in each of the plurality of screens. The screen assembly also has an assembling plate coupling together the plurality of screens. The plurality of screens overlap each other. A coupling assembly includes a generally C-shaped clamp which is optional and attachable to an upper door frame with hardware coupling the C-shaped clamp to the suspension bracket.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved door defender system which has all of the advantages of the prior art screen panels of various configurations and none of the disadvantages.

It is another object of the present invention to provide a new and improved door defender system which may be easily and efficiently manufactured and marketed.

It is a further object of the present invention to provide a new and improved door defender system which employs a durable and reliable construction.

An even further object of the present invention is to provide a new and improved door defender system which is susceptible of a low cost of manufacture with regard to both materials and labor, and which accordingly is then susceptible of low prices of sale to the consuming public, thereby making such door defender system economically available to the buying public.

Lastly, it is an object of the present invention, the door defender system is for restricting entry of flying insects from outdoors to indoors. It is a second line of defense against flying insects moving from outside to inside. The first line of defense is a shut door. These together with other objects of the invention, along with the various features of novelty which characterize the invention, are pointed out with particularity in the claims annexed to and forming a part of this disclosure.

For a better understanding of the invention, its operating advantages and the specific objectives attained by its uses, reference should be made to the accompanying drawings and descriptive matter in which there is an illustration of embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2A is an enlarged showing of a plug in operative position taken at circle 2A of FIG. 2.

FIG. 2B is an enlarged showing of the plug of FIGS. 2 and 2A.

FIG. 2C is an exploded perspective view showing the plug in its operative position.

FIG. 3 is a plan view taken along line 3-3 of FIG. 1.

FIG. 4 is an enlarged showing of the components in circle 4 of FIG. 2.

The same reference numerals refer to the same parts throughout the various Figures.

DESCRIPTION OF THE PREFERRED EMBODIMENT

Figure 1:
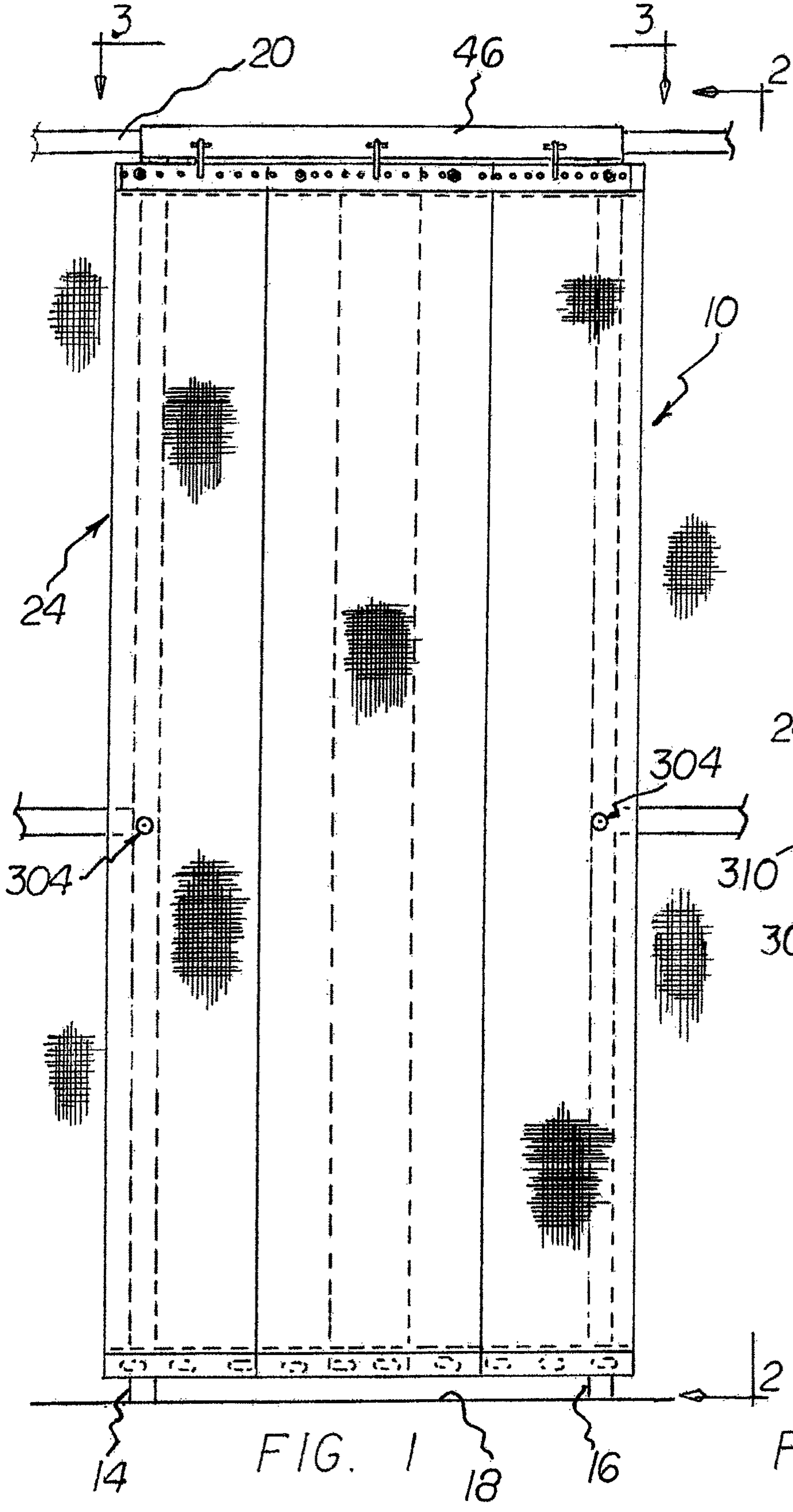
FIG. 1 is a front elevational view of the door defender system taken from inside the structure constructed in accordance with the principles of the present invention, partially illustrated is a portion of the structure in which the door defender is located.
Figure 2:
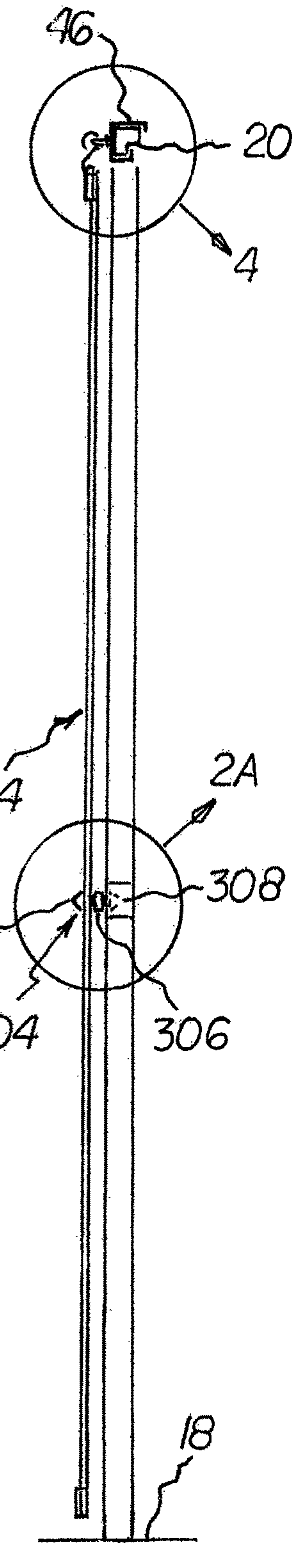
FIG. 2 is a side elevational view taken along line 2-2 of FIG. 1.
Figure 5:
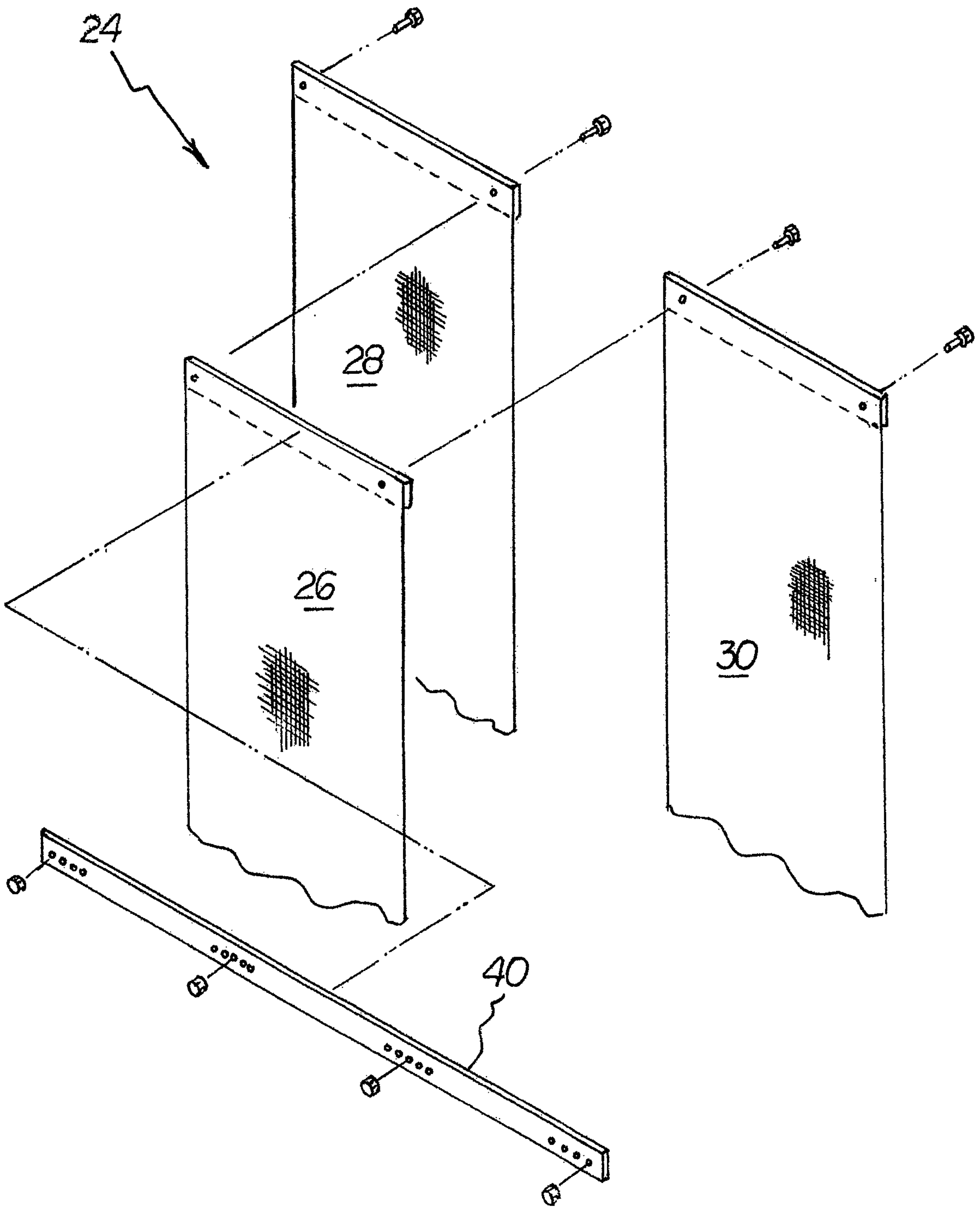
FIG. 5 is an exploded perspective view of the screen panels of the prior Figures.

With reference now to the drawings, and in particular to FIG. 1 thereof, the preferred embodiment of the new and improved door defender system is depicted. An alternative description of this system is the Gravity Reactive Suspension System or "G.R.S.S." The principles and concepts of the present invention will be described hereinafter.

The door defender system 10 is comprised of a plurality of components. Such components in their broadest context include a screen assembly of plural screen panels and a coupling assembly coupling the screen assembly to an upper panel suspension bracket. Such components, are individually configured and correlated with respect to each other so as to attain the desired objective.

From a specific perspective, the invention of the present application is a door defender system 10 to prevent most insects, including flying insects, from entering an interior area. The restricting of most flying insects is done in a safe, convenient, and economical manner. The system 10 includes a doorway opening formed with a left door frame 14 and a right door frame 16 separated by a width of approximately 36 inches, plus or minus five percent. The doorway opening has a lower extent or a lower door frame 18 and an upper door frame 20 separated by a height of approximately 84 inches, plus or minus five percent.

Figure 6:
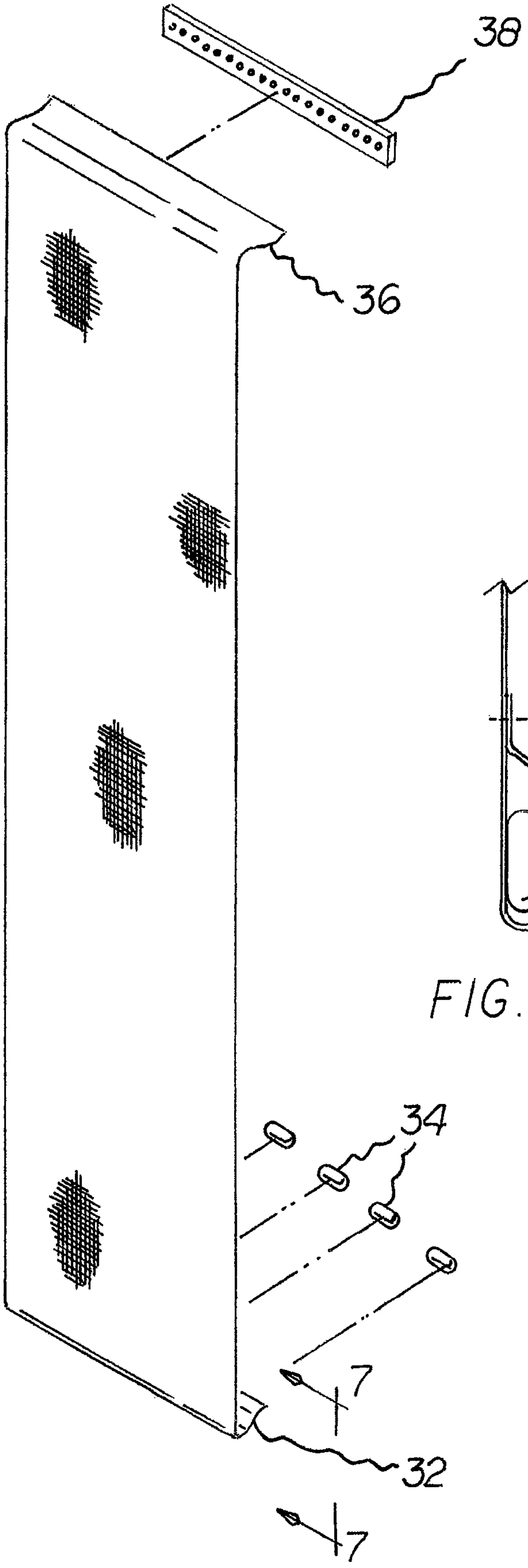
FIG. 6 is an exploded perspective view of one of the screen panels of the prior Figures.
Figure 7:
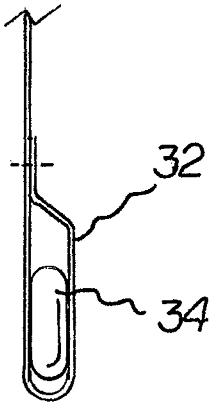
FIG. 7 is an enlarged end view taken along line 7-7 of FIG. 6.

A screen assembly 24 has a central (or center) screen 26, a left side screen 28, and a right side screen 30. The central screen 26, the left side screen 28, and the right side screen 30 each have a height of approximately 82 inches, plus or minus five percent, and a width of approximately 36 inches, plus or minus five percent. A bottom hem 32 (FIG. 6) with a plurality of weights 34 is provided in the central screen 26, the left side screen 28, and the right side screen 30. An upper hem 36 (FIG. 6) with an upper plate 38 is provided in each of the central screen 26, the left side screen 28, and the right side screen 30. An assembly plate 40 (or suspension track) couples together the central screen 26, the left side screen 28, and the right side screen 30. A left 30 to 35 percent of the central screen 26 overlaps a right 30 to 35 percent of the left side screen 28. A right 30 to 35 percent of the central screen 26 overlaps a left 30 to 35 percent of the right side screen 30. For this configuration, a 4 inch overlap is provided for each of the right and left screens (30, 28) over the center screen 26. Each of the panels (26, 28, and 30) has an associated upper plate 38. Thus, these upper plates 38 also overlap with one another, preferably by 4 inches.

A coupling assembly 44 (FIG. 4) includes a C-shaped clamp 48 (which is optional) that is removably coupled to the assembly plate 40 and upper door frame 20. As depicted in FIG. 4, C-shaped clamp 48 clips to the upper door frame 20. The C-shaped clamp 48 has a horizontal section 46 with vertical holes and a forward face with two laterally spaced apertures 50. Two eye-bolts 52 are provided, with each eye-bolt 52 extending outwardly from one of the two laterally spaced apertures 50. Two holes 54 extend respectively through the center of each screen and its associated upper plate 38 and the assembly plate 40. The coupling assembly 44 also includes two S-shaped hooks 58 each having an upper region 60 extending respectively through an eye-bolt 52 and a lower region 62 extending through the holes of the assembly plate 40 and the associated upper plate 38.

The door defender system 10 optionally includes, upon request, at least two C-shaped mechanisms 100 (FIG. 4) for securing the C-shaped clamp to the upper door frame. This is provided for families with small children and for added strength.

The door defender system 10 also optionally includes screws 200 (FIG. 3) that can be secured through the horizontal section 46 of clamp 48 once positioned on the upper door frame 20. This gives the door defender system 10 added stability.

Another optional feature of the present invention is a wind stabilization plug assembly 304. The wind stabilization plug assembly includes a stabilization plug 304. The stabilization plug includes a central cylinder 306 with a small cone 308 at a first end and a large cone 310 at a second end. A hole 314 is drilled into a frame of a door for removably receiving the small cone. An aperture 318 is formed in the two outer screen panels for receiving the wind stabilization plug. The stabilization plug when inserted into the door frame and attached to the screen panel prevents undesired screen panel movement during heavy winds along with most flying insects entering a living space. This is reflected in FIGS. 2, 2A, 2B, and 2C.

As described, this invention is a door defender system for restricting entry of most flying insects into a confined pool or patio cage area. It mounts on the entrance/exit. It keeps most flying insects out by reducing the opening area of the doorway and when a person/pet/etc. passes through the door defender the screen panels form around them reducing the open area even more. The door defender can be replicated durably and is made of quality materials and economically manufactured. The door defender system has five main components: a suspension bracket, an assembly plate, a suspension track, 3 screen panels, and weights. The screen panels have subassemblies. The C-clamp attachment is available upon request for households having small children, but optional, and there may be some drilling required which is also optional. The door defender attaches above the doorway of the exit to the yard doorway on the inside of the doorway overhead frame or cross member. The door defender will fit the standard doorway of 36"×84". For any opening whether large or small, the same concept, applies. The door defender system prevents flying insects from entering. It can be made to adapt to any doorway or frame just by changing the suspension bracket and adding screen panels. For protecting larger or smaller openings, it is ideal. It protects against wasps, bees, hornets, yellow jackets, gnat and mosquitos. Many of these insects carry disease and can be dangerous.

The door defender system is your second line of defense. Your door is your first line of defense. In assembling the door defender, the user starts with the suspension bracket 48, attaches eye bolts 52 in the 2 holes 50 on the front of the suspension bracket 48, then then attaches it to the suspension track (or assembly plate) 40. Next, the panels 26, 28, and 30 are secured to assembly plate 40. The panels (26, 28, and 30) can then be secured to the coupling assembly 38, 40 via S-shaped hooks 58. The panels are attached approximately 2 inches from either end of the suspension track 40. A preferred overlap of approximately 4 inches is provided between the adjacent screens. This is a ¼ inch hole for wind stabilization plugs which require some drilling into the door frame in 2 areas which is optional, but the stabilization plugs are included.

Have you ever just wanted to peek out of a screened in enclosure? Well, with the door defender you can!

Have you ever needed to carry something straight into the house or area from the outside while stopping to open the door was a hassle? Not any more with the door defender.

Tired of people holding the screen door or door is left open and letting flying insects in? Problem solved! I don't have to tell you!

The kids, the pets, and anybody or anything that you want to enter or exit through the door defender other than flying insects is only limited by your imagination while allowing you accessibility, unhindered mobility while restricting most flying insects from entering with you by reducing and limiting the amount of unprotected area where flying insects may enter!

The door defender unique design allows it to do what prior art designs have failed to do! The door defender unique design allows it to react to what is passing through it! This reactive system allows the door defender to return to its original position once the individual or object or whatever has passed through it.

The door defender is great for protecting your space and your family in that space or area from nuisance flies, pesky wasps, bees, hornets, all those things flying around trying to sting you or take a bite out of you! But my favorite to hate, mosquitoes! There's just no telling what those things are carrying!

Your door is your first line of defense! The door defender is your second!

You get-em out! The door defender will keep-em out! "Get-em out and keep-em out" with a door defender—Gravity Reactive Suspension System!

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the arts, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A door defender system comprising:

a screen panel assembly having a plurality of overlapping screens, with each of the plurality of screens having an associated upper plate, the screen panel assembly also having an assembly plate coupling together each of the upper plates in an overlapping manner, whereby the plurality of screens overlap one another;

a coupling assembly including a generally C-shaped clamp attachable to an upper door frame and interconnecting the assembly plate to the upper door frame; and an anti-wind assembly, the anti-wind assembly including a plurality of wind stabilization plugs, each stabilization plug including a central cylinder with a small cone at a first end and a large cone at a second end, holes drilled into a frame of a door for removably receiving the small cones, apertures formed in each of the plurality of screens for removably receiving one of the large cones, the stabilization plugs when secured functioning to abate undesired screen movement during heavy winds.

2. An apparatus comprising:

a screen assembly having an assembly plate with four laterally spaced screw holes and a left side and a right side, a left screen panel, a right screen panel, and a central screen panel, the screen panels respectively having a left side and a right side, an upper hem with an upper plate having a left side and a right side and two laterally spaced screw holes, the upper plate extending through the upper hem, and a lower hem with a plurality of weights secured therein;

the right side of the left screen panel overlapping the left side of the central screen panel, the left side of the right screen panel overlapping the right side of the central screen panel;

the right side of the upper plate of the left screen panel overlapping the left side of the upper plate of the central screen panel, the left side of the upper plate of the right screen panel overlapping the right side of the upper plate of the central screen panel;

the assembly plate overlapping the upper plates of the respective screen panels and connecting the respective screen panels and their respective upper plates;

a coupling assembly having a C-shaped clamp with a left side and a right side, the C-shaped clamp being removably coupled to the assembly plate and being configured to be removably coupled to a door frame and having a horizontal section with vertical holes and a forward face with two laterally spaced apertures, two eye-bolts respectively extending through the left side and right side of the C-shaped clamp, and two S-shaped hooks with an upper region and a lower region, the upper regions of the respective S-shaped hooks extending through one of the eye-bolts, and the lower regions of the respective S-shaped hooks extending respectively through the left side and the right side of the assembly plate;

two C-shaped mechanisms respectively configured to secure the left side and the right side of the C-shaped clamp to the door frame; and a wind stabilization plug assembly having two stabilization plugs respectively having a central cylinder and a small cone at a first end and a large cone at a second end, the small cones respectively being configured to fit within a hole in the door frame and the large cones respectively being configured to fit within holes in the left screen panel and the right screen panel.

* * * * *